April 21, 1925.  A. A. TIRRILL  1,535,060

CONNECTING LINK

Filed Oct. 14, 1920

INVENTOR
Allen A. Tirrill
by William B. Wharton
his attorney

Patented Apr. 21, 1925.

1,535,060

UNITED STATES PATENT OFFICE.

ALLEN A. TIRRILL, OF PITTSBURGH, PENNSYLVANIA.

CONNECTING LINK.

Application filed October 14, 1920. Serial No. 416,860.

*To all whom it may concern:*

Be it known that I, ALLEN A. TIRRILL, a citizen of the United States, and resident of Pittsburgh, in the county of Allegheny and State of Pennsylvania, have invented a new and useful Improvement in a Connecting Link, of which the following is a specification.

This invention relates to a connecting link for chains and constitutes an improvement over the structure of copending application, Serial No. 375,331, filed April 20th, 1920. This connecting link is suitable for use in mending automobile tire chains, in mending or attaching chains for porch swings or the like; and in general, for any use in which chains are to be connected, or a chain is to be attached to an article. The connecting link may be made of such size and strength as to adapt it to any particular use.

For all the purposes above mentioned, it is essential that the connecting link should be of such nature that it cannot be pulled or shaken loose after it has been attached. For use in mending automobile tire chains, it is also essential that the connecting link should be easy to attach, should receive and securely retain chain links irrespective of the degree to which such links are worn, should be resistant to wear, and should be simple in form and inexpensive to manufacture.

The object of the invention is to provide a connecting link having the above enumerated advantages.

Figure 5:
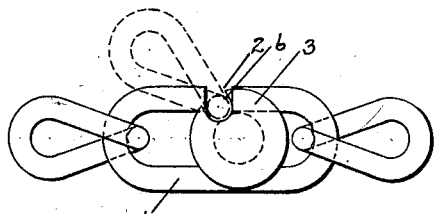
Figure 2:
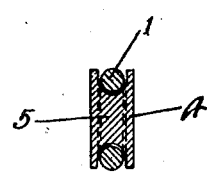
Figure 4:
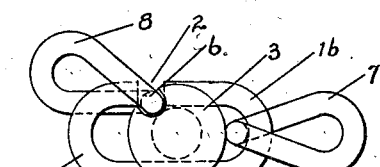
Figure 1:
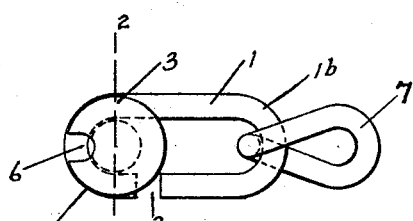
Figure 3:
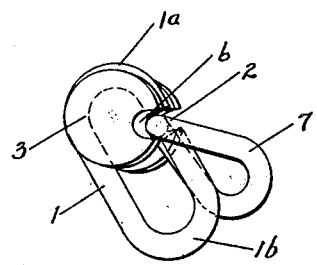

In the accompanying drawings Fig. 1 is a plan view of the connecting link; Fig. 2 is a cross sectional view on the line 2—2, Fig. 1; Fig. 3 is a perspective view of the connecting link illustrating the position of the tumblers in attaching the connecting link to or detaching it from a chain; Fig. 4 is a plan view illustrating the attachment of more than one chain link; and Fig. 5 is a plan view of a slightly modified form of the device.

The connecting link comprises a link or body member 1, which is formed of stiff wire or the like bent upon itself to form an elongated loop, and having therein a space or opening 2. Arranged to float in the link or body member 1 is a tumbler lock 3, which comprises a pair of notched plates or disks 4 joined by a connecting shank 5 formed integral with the plates 4. Each plate 4 is provided with a notch 6 arranged to receive a chain link in attaching the connecting link thereto or detaching it therefrom.

To mutually attach the connecting link and chain link, the lock 3 is brought into such position that the notches 6 of both plates are brought into register with the opening 2 in the body member. The chain link to be secured is then inserted into the notches and the tumbler lock is rotated until the chain link lies in the space within the body member. The lock is then rotated to lock the chain link within the body member 1.

In the form of the device illustrated in Figs. 1 to 4 of the drawings, the openings 2 in the link or body member is shown disposed to one side of the transverse central line of such member. This is in order that the connecting link may be used for the attachment of one chain as well as for the connection of two chains. If one chain only is attached, the lock 3 is placed in the short bend 1$_a$ of the body member before the notches 6 of the lock are brought into register with the opening 2. The chain link 7 is thus introduced into the long bend 1$_b$ of the link and is prevented from escaping by the lock 3 which wholly or partially closes the opening 2. This position is shown in Fig. 3 of the drawings.

If two chain links are to be connected, the lock is in such case also first brought into the short bend 1$_a$ of the connecting link and a link of one chain introduced into the long bend 1$_b$ of the link member. After the introduction of this link, the lock is moved into the long bend 1$_b$, bearing against the chain link 7 therein, and the notches 6 are again brought into register with the opening 2 to permit the introduction of the second chain link 8 into the short bend 1$_a$ of the body member. When the device is used thus for the connection of two chains, the link 7 lying in the long bend 1$_b$ of the body member prevents the lock 3 from moving so far therealong as to permit the chain link 8, lying within the short bend 1$_a$, from being accidentally withdrawn through the opening.

In order to disengage the connecting link and a chain link, the chain link lying within the link member 1 is caused to enter the notches 6. The lock is then moved to bring the notches 6, embracing the chain link, into register with the opening 2 and the lock rotated to carry the chain link out through the opening. In the event that the body member is used to connect two chains, the chain link 8 lying within the short bend $1_a$ is first withdrawn, and the lock 3 is then shifted for the withdrawal of the chain link 7 lying within the long bend $1_b$.

In the modification of the device illustrated in Fig. 5 of the drawings, the opening 2 lies on the transverse central line of the link or body member 1. This modification is intended only for the connection of two chains. In the use of this form of the device a chain link lies in each bend of the body member with the lock 3 between them. Each of the chain links thus prevents the lock 3 from being shifted so far in either direction along the body member as to expose the opening 2 and permit accidental withdrawal of the other link.

The device of the present invention differs from that of copending application, Serial No. 375,331, filed April 20, 1920, in that the tumbler lock is formed with the tumbler plates and their connecting shank integral, so that it provides a single tumbler having a double disk construction for engaging the link member 1. The advantage of such structure is that the rivet, a possible point of weakness is eliminated; and that the entire tumbler lock may be tempered as a whole. It also avoids the labor of assembling the lock.

It has been found in use that the likelihood that a chain link may enter the notches and be accidentally carried out of the link member through the opening therein is but little greater than where a pair of mutually rotatable tumbler disks, such as those embodied in the device of the above noted application, are employed. When the connecting link is employed as a mending link for tire chains, in which use it is subjected to the greatest agitation, it is found that the tendency is for the tumbler lock to become so jammed in the link member as to prevent any likelihood of accidental withdrawal of the chain link.

What I claim is:

1. The combination with an elongated link having an opening in one of its long sides forming an entrance and exit passage, of a lock member formed as an integral whole, rotatably confined within the link and freely movable lengthwise thereof across said opening and provided with transversely aligned notches arranged to co-operate with said opening for controlling passage therethrough.

2. A device according to claim 1 in which the lock member is formed in the nature of two discs rigidly connected by a waist portion.

3. A device according to claim 1 in which the lock member is formed in the nature of two disks of greater diameter than the distance between the long sides of the link and rigidly connected by a waist portion.

In witness whereof, I hereunto set my hand.

ALLEN A. TIRRILL.

Witnesses:
FLORENCE F. SCHWARTZ,
G. W. ALSTON.